United States Patent [19]

Sapkowski

[11] 4,437,128
[45] Mar. 13, 1984

[54] SYSTEM AND METHOD OF RECORDING AND REPRODUCING WIDE BAND CHANNEL INFORMATION BY MEANS OF SEVERAL NARROW BAND CHANNELS

[75] Inventor: Mechislao Sapkowski, Caracas, Venezuela

[73] Assignee: Manfred Fred Horeck, Novato, Calif. ; a part interest

[21] Appl. No.: 212,243

[22] Filed: Dec. 2, 1980

[51] Int. Cl.³ .............................................. H04N 5/76
[52] U.S. Cl. ...................................... 358/335; 360/22; 360/33.1
[58] Field of Search ................... 360/22, 23, 24, 32, 360/33, 34, 26, 27, 30, 8, 9.1, 33.1, 34.1; 358/127, 138, 335; 369/47, 48, 93, 95, 60; 375/23; 370/118; 179/15.55 R

[56] References Cited

U.S. PATENT DOCUMENTS

| | | | |
|---|---|---|---|
| 2,952,745 | 9/1960 | Walker | 360/23 |
| 3,359,364 | 12/1967 | Kihara | 360/33 |
| 3,806,640 | 4/1974 | Furukawa | 360/23 |
| 3,975,764 | 8/1976 | Kobayashi | 360/23 |
| 4,068,265 | 1/1978 | Russell | 358/138 |
| 4,146,099 | 3/1979 | Matsushima | 360/32 |
| 4,232,329 | 11/1980 | Horck | 360/22 |

Primary Examiner—Alan Faber
Attorney, Agent, or Firm—Fleit, Jacobson, Cohn & Price

[57] ABSTRACT

A system and method of recording and reproducing wide band channel information by means of several narrow band channels involves sampling of wide band channel information, providing respective samples to corresponding narrow band channels wherein recording and reproduction take place, reproducing the narrow band signals, amplifying and shaping the reproduced narrow band signals, and then combining and amplifying the resulting narrow band signals to reproduce the original wide band signal. A preferred embodiment of the present invention involves dot interlacing the received wide band information signals in accordance with a derived sync signal to derive sample pulse outputs. Various embodiments are provided for shaping the reproduced narrow band channel signals in accordance with "phase modulation", "amplitude modulation", and "frequency modulation" modes of operation.

25 Claims, 11 Drawing Figures

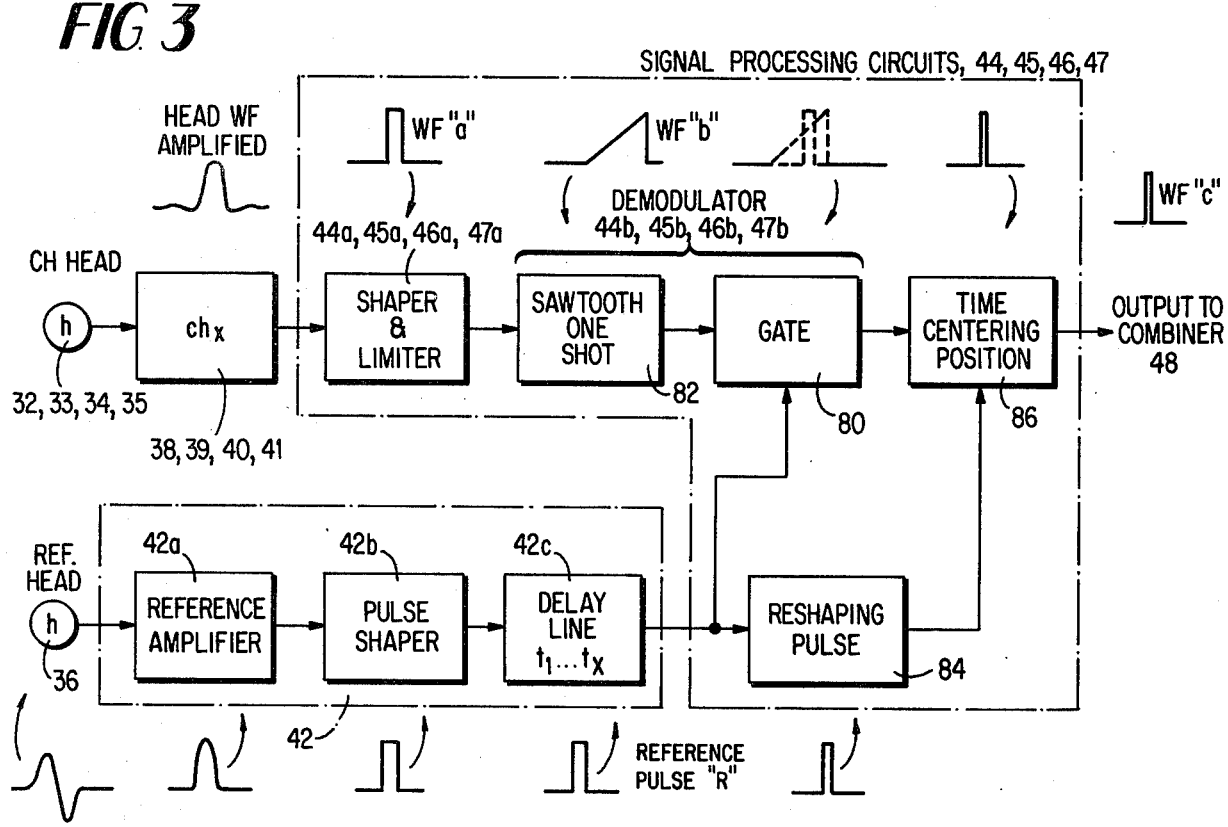
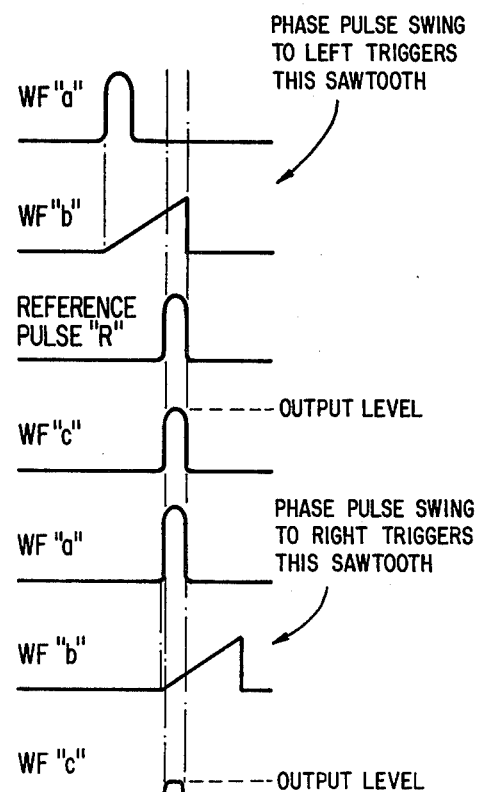

SYSTEM AND METHOD OF RECORDING AND REPRODUCING WIDE BAND CHANNEL INFORMATION BY MEANS OF SEVERAL NARROW BAND CHANNELS

BACKGROUND OF THE INVENTION

The present invention relates to a system and method of recording (or transmitting) and reproducing (or receiving) wide band information by means of several coordinated narrow band channels. More particularly, the invention relates to a system and method, wherein periodic coordinated samples of a wide band signal are taken and provided to respective narrow band channels wherein recording (or transmitting) and reproduction (or reception) take place, the received samples being amplified, shaped and combined so as to reproduce the original wide band signal.

Previous systems and methods of recording and reproducing wide band channel information have performed recording and reproduction within the wide band channel itself. This has lead to several disadvantages, principal among which is the necessity to use a high relative head-to-tape velocity, which, in turn, necessitates the provision of rotating heads and sophisticated servo circuits with all the associated problems of head wear, leading to a relatively short life and a high cost. In addition, it is necessary to provide delicate adjustment and frequent maintenance with respect to the recording and reproduction heads within the recording/playback system.

SUMMARY OF THE INVENTION

In contrast to the prior art arrangements discussed above, the present invention has the advantage of utilizing stationary heads combined with relatively low tape speed, without the necessity of employing complex servo circuits. This leads to a simpler and smaller video tape recording unit. In addition, utilization of the presently disclosed inventive system makes it possible to use several different routes with different types of modulation, so as to obtain a secret transmission code and a coherent signal at reception, after decoding and recombining the aforementioned narrow band channels.

In addition, with the inventive system presently disclosed, it is possible to use lines of poor frequency characteristic instead of good coaxial-type lines. The same applies to transmission by means of RF transmitters, as well as any type of recording media.

Therefore, in accordance with the present invention, there are provided a system and method of recording (or transmitting) and reproducing (or receiving) wide band channel information by means of several narrow band channels.

More particularly, in accordance with the inventive system and method, wide band channel information is sampled, and respective samples are provided to corresponding narrow band channels, wherein recording and reproduction take place (via stacked recording heads and reproduction heads, as well as transmitters and receivers, over transmission lines or by radio frequency). Then, in each narrow band channel, the reproduced narrow band signal is amplified and shaped, and the respective amplified and shaped narrow band signals are then combined and amplified, so as to reproduce the original wide band signal.

A preferred embodiment of the system of the present invention includes a conventional video amplifier, a sampling trigger pulse generator and sampler, a plurality of narrow band channels (including a reference channel), a plurality of recording heads and corresponding reproduction heads (or transmitters and receivers), a plurality of narrow band amplifiers (including a reference amplifier), a plurality of shaper circuits, a combiner circuit, and a wide band amplifier.

In a further embodiment of the present invention, a dot interlace circuit is provided between the video amplifier and the sampler, the dot interlace circuit performing sampling dot interlacing. More specifically, the dot interlace circuit of this embodiment maintains a constant frequency relationship (preferably odd) between the horizontal synchronization or color synchronization burst of the video signal received by the input of the system, on the one hand, and the sampling frequency, on the other hand. This dot interlace circuit, although not absolutely necessary in order to achieve recording and reproduction of minimal quality, provides improved quality by reducing visible moires which often occur in video signals when an odd relationship is not maintained. That is to say, according to the so-called "interlace" principle, when an odd frequency relationship is employed, then cancellation in subsequent fields of the image on the display (for example, a CRT screen) occurs in each subsequent field of the image. This is the same principle employed with color subcarrier in order to obtain invisibility in the screen of the picture tube.

Finally, it is to be noted that, in order to achieve perfect color reproduction, there are several methods which can be employed. A first method involves the utilization of a sufficiently high sampling frequency so as to reproduce color subcarrier included in the input video signal without distortion. A second method involves the employment of one or two additional complete systems, each one being intended for color subcarrier or for algebraic color components, or for direct color itself.

Accordingly, it is an object of the present invention to provide a system and method of recording and reproducing wide band channel information by means of several narrow band channels.

It is an additional object of the present invention to provide a system and method of recording and reproducing wide band channel information, wherein a received wide band video signal is amplified and sampled, respective samples being provided to corresponding narrow band channels, wherein recording, reproduction, transmission or reception take place, the reproduced narrow band signals being amplified and shaped, and then combined to reproduce the original wide band signal.

It is an additional object of the present invention to provide a system and method of recording and reproducing wide band channel information by means of several narrow band channels, wherein visible moires in the reproduced signal are reduced or eliminated by performance of a sampling dot interlacing function.

The above and other objects that will hereinafter appear, and the nature of the invention, will be more clearly understood by reference to the following description, the appended claims, and the accompanying drawings.

BRIEF DESCRIPTION OF THE DRAWINGS

FIG. 3 is a more detailed block diagram of the processing circuits of FIG. 1C in the "phase modulation" mode of operation.

FIGS. 4A, 4B and 4C are waveform diagrams utilized to describe the operation of the processing circuits of FIG. 3.

DETAILED DESCRIPTION

The present invention will now be more fully described with reference to FIG. 1A, which is a general block diagram of the system of the present invention.

Figure 1A:
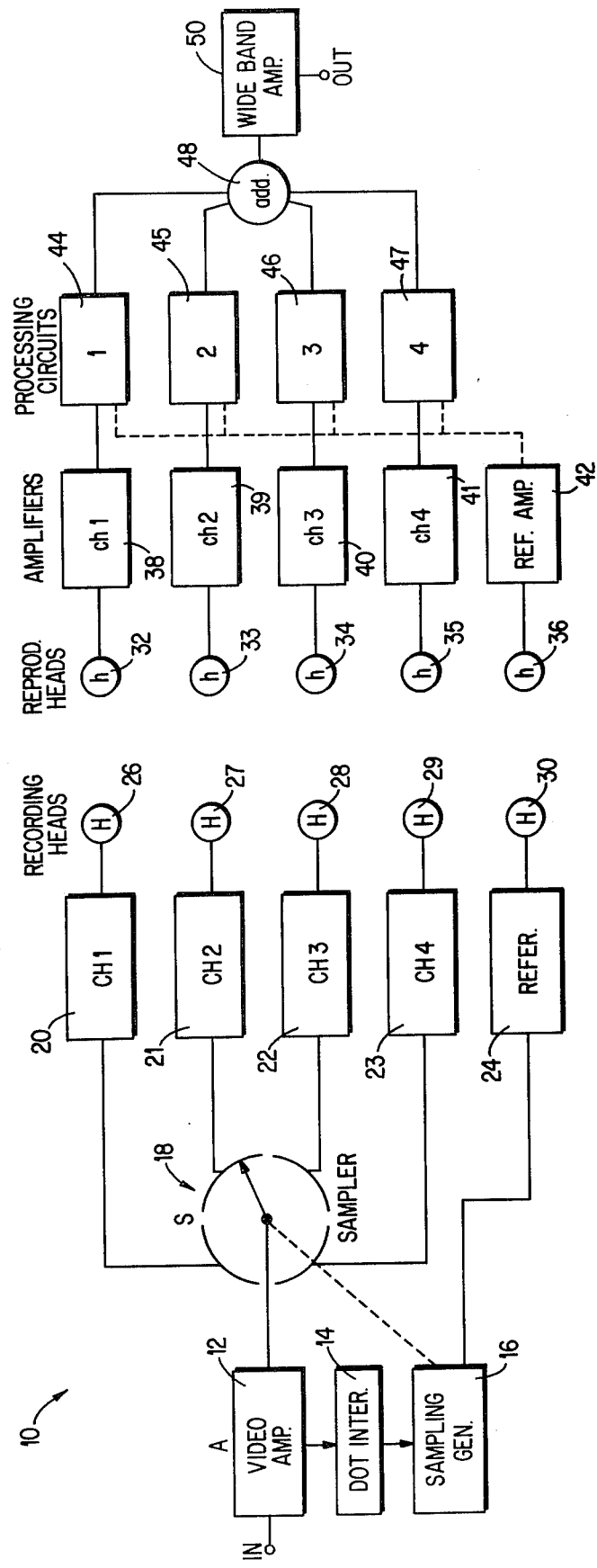
FIG. 1A is a general block diagram of the system of recording (or transmitting) and reproducing (or receiving) wide band channel information by means of several narrow band channels.

As seen in FIG. 1A, the system 10 of the present invention comprises a video amplifier 12, a dot interlace circuit 14, a sampling generator 16, a sampler 18, narrow band recording channels 20–23, a narrow band reference channel 24, recording heads 26–30, reproduction heads 32–36, narrow band amplifiers 38–41, a narrow band reference amplifier 42, processing circuits 44–47, a combiner (or adder) circuit 48, and a wide band amplifier 50.

The operation of the system 10 of FIG. 1A will be described in more detail below with reference to FIG. 1B which is a more detailed block diagram of the transmitting or recording side of the system, and FIG. 1C which is a more detailed block diagram of the receiving or reproducing side of the system, as well as FIG. 2 which comprises a series of waveform diagrams relating to the operation of the system in the "amplitude modulation" mode. Moreover, the "phase modulation" mode will be described below with reference to FIG. 3 which is a more detailed block diagram of the processing circuits of FIG. 1 in the "phase modulation" mode of operation, as well as FIGS. 4A and 4B which are waveform diagrams utilized to describe the operation of the processing circuits of FIG. 3.

Figure 2:
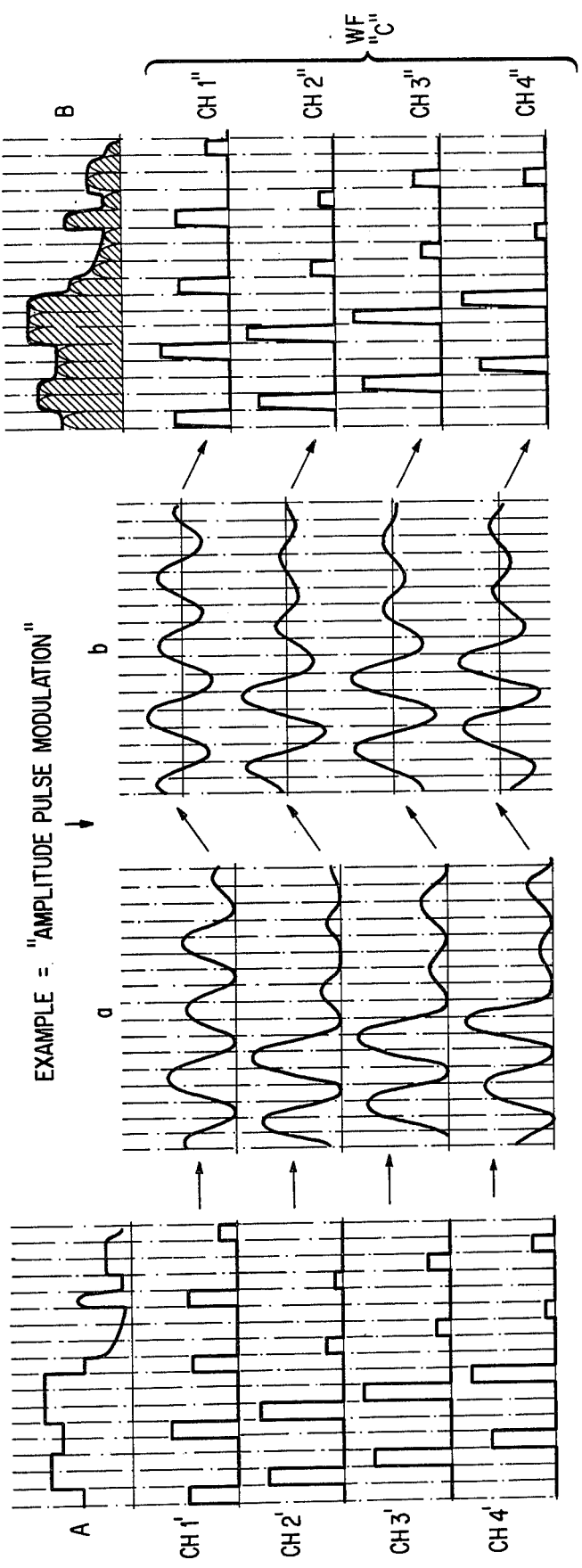
FIG. 2 is a series of waveform diagrams utilized for explaining the operation of the system of FIG. 1A in the "amplitude modulation" mode.

Referring to FIGS. 1A and 2, in operation, the system 10 receives an incoming wide band signal and, via video amplifier 12, amplifies the incoming signal in a conventional manner. Waveform A of FIG. 2 represents the incoming wide band signal, as amplified by video amplifier 12.

Dot interlace circuit 14 receives the amplified incoming wide band signal, separates synchronization, and performs a "sampling dot interlacing" function with respect thereto. Interlace occurs when an odd frequency relationship is used because, then, cancellation in subsequent fields of the video signal occurs because of opposite phases of the above-mentioned sampling frequency. This is the same principle used with color subcarrier in order to obtain invisibility. Thus, dot interlace circuit 14 maintains a constant frequency relationship between the horizontal synchronization of the video signal (or color subcarrier) and the frequency of sampling (performed by the sampling generator 16 in conjunction with the sampler 18). A more detailed description of the operation performed by the dot interlace circuit 14 will be provided below, in connection with the description of FIG. 1B.

Continuing, with reference to FIG. 1A, the output of dot interlace circuit 14 is provided to a sampling generator 16 which, as will be described in more detail below with respect to FIG. 1B, generates sampling gate pulses and provides them to the sampler 18.

In response to receipt of the sampling gate pulses, the sampler 18 provides respective samples from the output of video amplifier 12 to corresponding channels 20–23. It is to be noted that sampling pulse generator 16 can be, as illustrated below, implemented by a ring counter circuit or a line delay plurality-phase circuit.

The sampling pulse generator 16 also provides an output to reference channel 24. It is to be noted that the input signal to reference channel 24 can be obtained from the dot interlace circuit 14 indirectly (via the sampling pulse generator 16, as illustrated in FIG. 1B), or can be obtained directly from the dot interlace circuit 14.

Thus, as a result of sampling of the wide band signal provided at the output of video amplifier 12, sampler 18 provides respective narrow band samples, via channels 20–23, to recording heads 26–29. Alternatively, instead of recording heads 26–29, transmitting channels can be employed. Recording heads (or transmitting channels) 26–29 perform recording of the narrow band samples in a conventional manner, or in a simplified manner without bias frequency, as distortion is of no importance here. That is to say, the distortion wave is not important in this step because information is carried by amplitude- or time-modulation, not by wave shape. Moreover, the reference pulse, provided at the output of reference channel 24, is also recorded via recording head (or transmitting channel) 30.

The system 10 also includes reproduction heads (or receiving channels) 32–35 for reproducing the recorded narrow band samples on the respective channels, as well as an additional reproduction head (or receiver) 36 for reproducing the reference signal recorded by recording head 30.

Amplifiers 38–41, one for each channel, receive and amplify the reproduced signals provided by reproduction heads (or receiving channels) 32–35, and provide these amplified signals to processing circuits 44–47. In addition, reference amplifier 42 receives and amplifies the reproduced reference signal provided by reproduction head (or receiving channel) 36, and provides its amplified output to each of the circuits 44–47.

Prior to discussing the function performed by circuits 44–47, it should be noted that any one of several modulation techniques may be employed and implemented in the narrow band channels 20–23. Modulation techniques which may be employed include pulse width modulation (PWM), pulse code modulation (PCM), pulse phase or position modulation (PPM), pulse amplitude modulation (PAM), and frequency modulation (FM). FIG. 2 shows, via waveforms "a" and "b", an example implementing pulse amplitude modulation (PAM). It is also to be noted that no modulation takes place in reference channel 24, since this channel is used only as a reference signal channel.

Returning to consideration of FIG. 1A, circuits 44–47 operate, in a manner to be described in more detail below with respect to FIG. 3, to shape the narrow band signals produced at the output of channel amplifiers 38–41. The shaped narrow band signals are then combined (added) in combiner or adder circuit 48, the resulting output being amplified in wide band amplifier 50, so as to recover the original wide band signal.

Figure 1B:
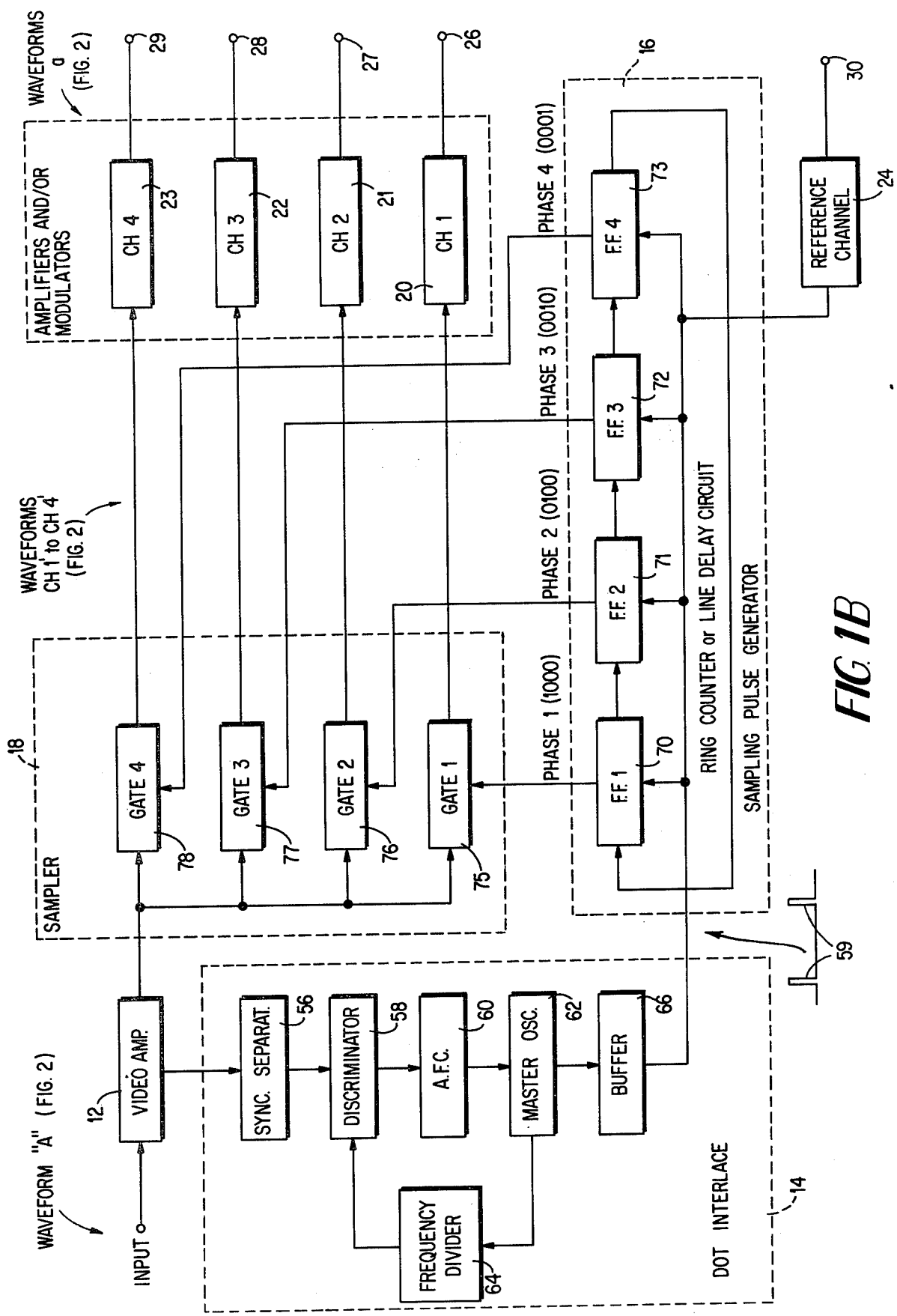
FIG. 1B is a more detailed block diagram of the recording or transmitting side of the system.

FIG. 1B is a more detailed block diagram of the transmitting or recording side of the system, and includes a detailed diagram of the dot interlace circuit 14 of FIG. 1A. As seen therein, dot interlace circuit 14 comprises a sync separator 56, phase discriminator 58, automatic frequency control (AFC) circuit 60, master oscillator 62, frequency divider chain 64, and a buffer 66.

In operation, sync separator 56 receives the amplified video signal from video amplifier 1, and, in a conventional manner, separates a sync signal from the video signal, providing the sync signal to phase discriminator 58. Phase discriminator 58 is a conventional circuit which performs the function of comparing one frequency against the other, and, when both frequencies or phases are exactly the same, produces a DC voltage output which is zero. This DC voltage output is provided to the AFC 60, which performs the function of changing parameters of the master oscillator 62 via conventional automatic frequency control techniques. By so changing the frequency of the master oscillator 62, a correct frequency relationship between the master oscillator 62 and the horizontal sync pulse of the video signal (as amplified by video amplifier 12) is automatically maintained.

The output of master oscillator 62 is, in turn, provided both to frequency divider chain 64 and buffer 66. Since the master oscillator frequency is many times higher than the horizontal sync frequency, it is necessary to divide (in frequency divider chain 64) by the same factor in order to obtain a frequency equal to the horizontal sync frequency so that the discriminator 58 can properly perform its function.

Finally, buffer 66 performs a buffering operation with respect to the oscillator output, and provides its buffered contents as an output to sampling pulse generator 16. This output of the dot interlace circuit 14, as provided to the sampling pulse generator 16, is shown by waveform 59 of FIG. 1B.

FIG. 1B also includes more detailed block diagrams of the sampling pulse generator 16 and sampler 18 of FIG. 1A. As shown therein, sampling pulse generator 16 comprises flip-flops 70–73 (forming a ring counter), while sampler 18 includes gates 75–78.

In operation, output pulses 59 (FIG. 1B) from the dot interlace circuit 14 (FIGS. 1A and 1B) are provided as clock inputs to the flip-flop devices 70–73. Flip-flops 70–73 are connected in feedback configuration so as to form a ring counter which changes its state (those states being 1000, 0100, 0010 and 0001) upon receipt of each pulse from the dot interlace circuit 14. Gates 75–78 are respectively enabled by corresponding square waves from flip-flops 70–73 of the ring counter. Thus, receipt of each successive square pulse from the dot interlace circuit 14 results in enablement of each successive one of the gates 75–78. Corresponding narrow band samples of the video input from video amplifier 12, which video input is provided to each of the gates 75–78, are provided to the respective channel devices 20–23 connected to the output of respective gates 75–78.

Figure 1C:
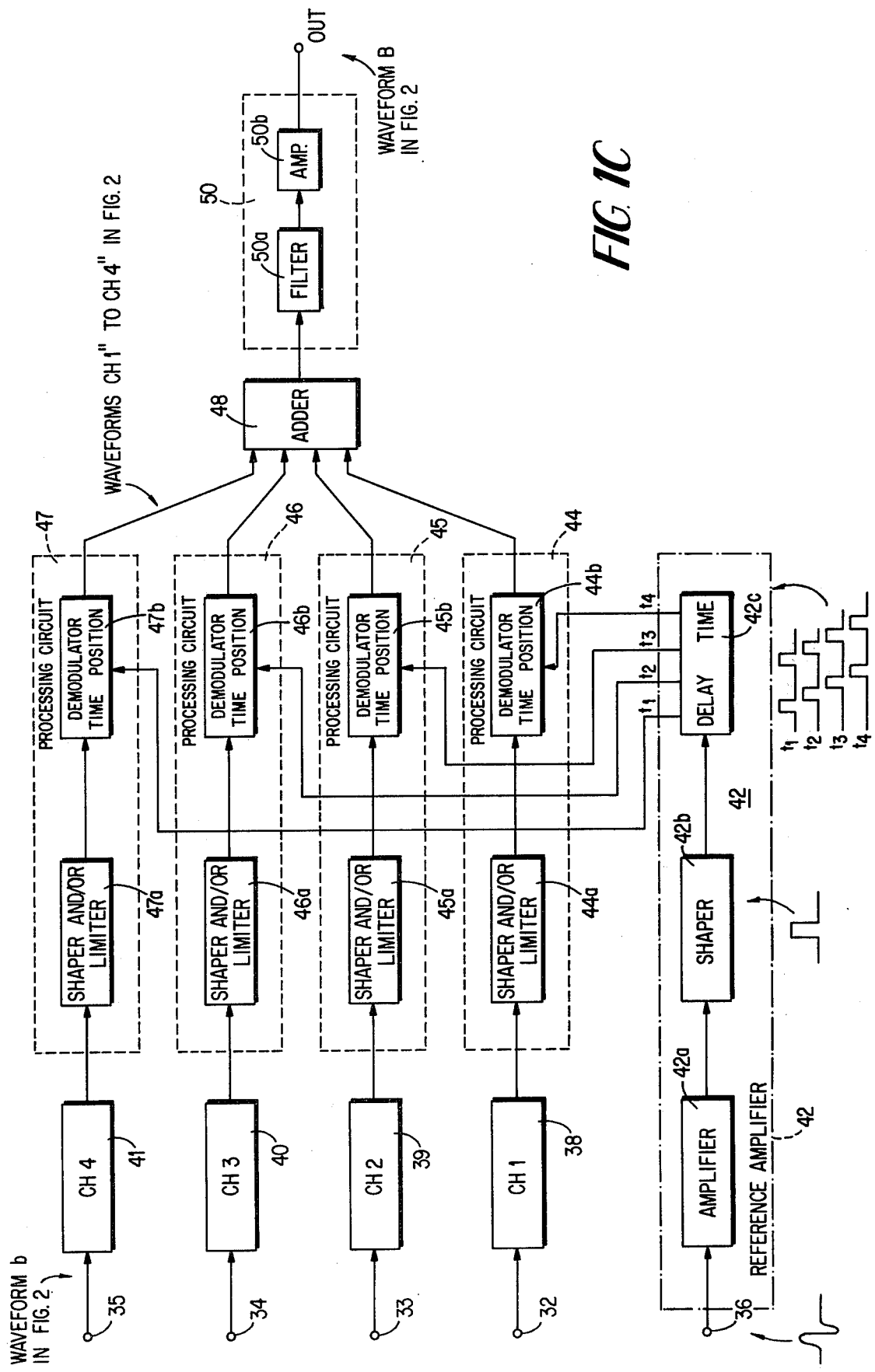
FIG. 1C is a more detailed block diagram of the reproducing or receiving side of the system.

FIG. 1C is a more detailed block diagram of the reproducing or receiving side of the system, operating in the "phase modulation" mode. A more detailed block diagram of the processors 44–47 is shown in FIG. 3.

Referring to FIGS. 1C and 3, in operation, reproduced or received narrow band signals are provided to respective channel amplifiers 38–41 by channel heads 32–35, respectively, while the reference signal is provided by reference head 36 to reference processor 42. Amplifiers 38–41 perform conventional amplification, with the output of amplifiers 38, 39, 40 and 41 being provided to processing circuits 44, 45, 46 and 47, respectively.

As also seen in FIG. 3, each processing circuit comprises a shaper and/or limiter circuit 44a, 45a, 46a and 47a, a demodulator 44b, 45b, 46b and 47b, a (optional) time centering circuit 86 and a (optional) reshaping pulse circuit 34.

Moreover, as seen in FIG. 3 each demodulator 44b, 45b, 46b and 47b, comprises a sawtooth generator of the one shot type 82, and a gate 80, for receiving the output of the above-mentioned sawtooth generator and also for receiving the enable or reference pulse "R" from delay line 42c. There are also, (optionally) a centering circuit 86 connected to the output of delay line 42c through a (optional) pulse reshaper 84.

The shaped pulse output of pulse shaper 44a–47a drives a sawtooth generator 82 which provides a sawtooth output to gate 80. Gate 80, in turn, is enabled by the pulse output of delay line 42c so as to pass the narrow pulse component of signal from channel 38,39,40 and 41 to a centering circuit 86 which is provided (optionally) in order to properly center the output pulse of the gate 80.

The output of shaper circuits 44a–47a is then provided, as seen in FIG. 1C and FIG. 3, to corresponding demodulator circuits 44b–47b. The latter are enabled by staggered pulses received from time delay circuit 42c. (Which is driven by amplifier 42a via shaper 42b of reference processor 42).

The staggered pulses from time delay circuit 42c (as seen in FIG. 1C) successively actuate corresponding demodulator channel (CH1, CH2, CH3 and CH4) circuits 44b–47b into his time corresponding successive place so as to successively provide the outputs of amplified, shaped and/or limited (accordingly to modulation mode) signal from circuit 44a–47a to the adder 48.

The outputs to combiner or adder 48 are generally represented by waveform "c" in FIGS. 4A and 4B, and are specifically shown as waveforms CH1,CH2,CH3 and CH4 respectively.

It is to be noted that the above-mentioned waveform "c" is the same waveform, independent of the type or mode of modulation and demodulation used.

FIGS. 4A and 4B are waveform diagrams used to describe the operation of the processor circuits 44,45,46 and 47 of FIG. 3 in the "phase modulation" mode. Specifically, as seen in FIGS. 4A and 4B, waveforms "a" provided at the output of the shapers and limiters 44a–47a are passed to sawtooth generator 82 which provides a sawtooth to gate 80 which is enabled by the reference pulse "R" provided by circuit 42c. As a result waveforms "c" are provided at the outputs of processors 44–47.

More specifically, referring to FIGS. 4A and 4B, it can be seen that waveform "c" will have an amplitude which will vary depending on the particular type of phase swing (to the left or right), that is, the particular phase relationship between the waveform "a" and the reference pulse "R". Thus, a phase swing to the left (as shown in FIG. 4A) will result in an output waveform "c" of relatively large amplitude, while a phase swing to the right (as shown in FIG. 4B) will result in a waveform "c" of relatively small amplitude. In the latter manner, processors 44–47 convert the low frequency, narrow band signals provided thereto (such as waveform "a") to sharp pulses of variable amplitude (waveform "c").

Figure 5:
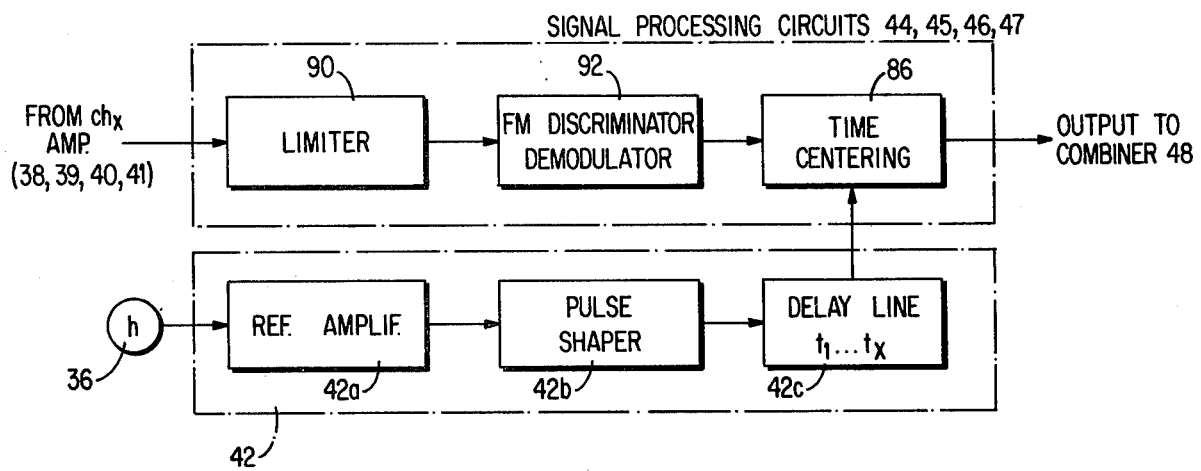
FIG. 5 is a more detailed block diagram of the processing circuits of FIG. 1C in the "frequency modulation" mode of operation.

Finally, further referring to FIG. 1C, the output of adder 48 is provided to a wide band amplifier 50, comprising a filter 50a and an amplifier 50b. The function of these elements has been previously described with reference to FIG. 1A. FIG. 5 is a more detailed block diagram of the shaper circuits of FIG. 1C in the "frequency modulation" mode of operation. As seen therein, the signal processing circuits 44–47 each comprise a limiter 90, FM discriminator 92, time centering 86, pulse reference amplifier 42a, shaper 42b and delay line 42c.

In operation, the outputs of amplifiers 38–41 are provided to limiter 90 in each of processing circuits 44–47 wherein limiting takes place. The output of limiter 90 is provided to FM discriminator 92 wherein discrimination takes place. Following the discrimination function, the discriminator output is provided to shaper and time centering circuit 86, which also receives the output of reference pulse "R" (the latter being identical in composition and function to the pulse shaper 42b and 42c of FIG. 3). Once the shaping and time-centering function takes place, the resulting output of processing circuits 44–47 are provided (via appropriate time positioning circuits) to the adder/combiner 48 (FIG. 1C).

Figure 6A:
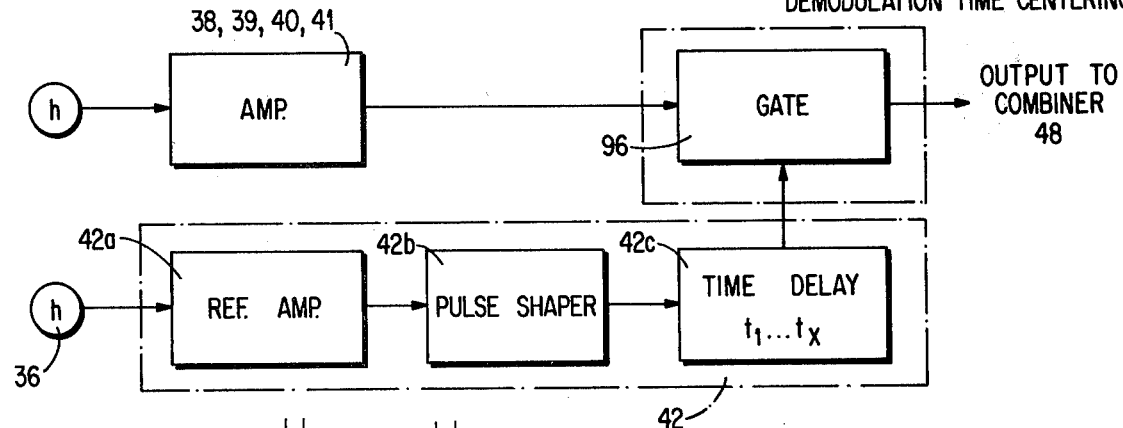
FIGS. 6A and 6B are a more detailed block diagram of the processing circuits of FIG. 1C in the "amplitude modulation" mode of operation and associated waveforms.
Figure 6B:
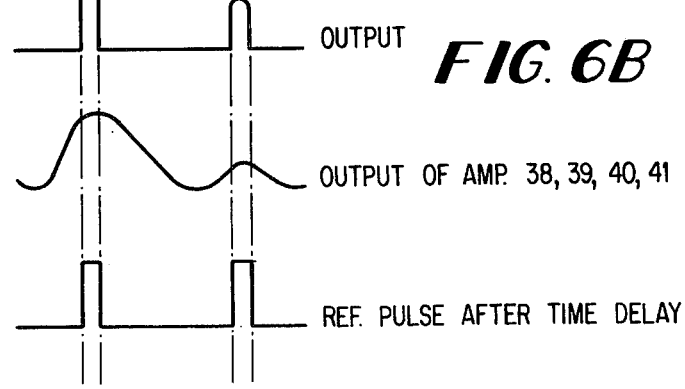

FIG. 6A is a detailed block diagram of the processing circuits of FIG. 1C operating in the "amplitude modulation" mode of operation, while FIG. 6B is a waveform diagram related to FIG. 6A. As seen in FIG. 6A each of processing circuits 44–47 merely comprises a gate circuit 96 which, in response to timing pulses t1–t4, merely gates the output of amplifiers 38–41 (FIG. 1C) through to the adder/combiner 48.

While preferred forms and arrangements have been shown and illustrated in the invention, it is to be clearly understood that various changes in detail and arrangement may be made without departing from the spirit and scope of this disclosure.

What is claimed is:

1. A method of recording and reproducing wide band channel information signals by means of several narrow band channels, comprising the steps of:
    receiving said wide band channel information signals;
    sampling said received wide band channel information signals so as to derive a plurality of narrow band channel signals;
    recording and reproducing said plurality of narrow band channel signals to obtain a corresponding plurality of reproduced narrow band channel signals;
    shaping each of said plurality of reproduced narrow band channel signals to obtain corresponding shaped output signals; and
    combining said corresponding shaped output signals so as to recover and reproduce said wide band channel information signals;
    wherein said shaping step comprises limiting said plurality of reproduced narrow band channel signals to provide corresponding limiter outputs, discriminating said limiter outputs to provide discriminator outputs, and shaping and time-centering said discriminator outputs to obtain said corresponding shaped output signals.

2. The method of claim 1, further comprising the step, between said receiving step and said sampling step, of dot interlacing said received wide band channel information signals in accordance with synchronization of said wide band channel information signals to derive sample pulse outputs, said sampling step comprising sampling said received wide band channel information signals in accordance with said sample pulse outputs.

3. The method of claim 2, wherein said dot interlacing step comprises deriving a horizontal sync signal from said received wide band information signal, phase discriminating said horizontal sync signal to derive a phase discriminator output, generating an oscillator output having a frequency, said controlling said generating of said oscillator output so that said frequency is in accordance with said phase discriminator output.

4. The method of claim 3, wherein said received wide band channel information signal comprises a video signal.

5. The method of claim 1, wherein said sampling step comprises generating a frequency for reference in an additional channel signal, and wherein said shaping step comprises generating a waveform output in accordance with said reference, and gating each successive narrow band recorded and reproduced signal in correspondence to said waveform output.

6. A system for recording and reproducing wide band channel information signals by means of several narrow band channels, comprising:
    receiving means for receiving said wide band channel information signals;
    sampling means for sampling said received wide band channel information signals so as to derive a plurality of narrow band channel signals;
    recording and reproducing means for recording and reproducing said plurality of narrow band channel signals to obtain a corresponding plurality of reproduced narrow band channel signals;
    shaping means for shaping each of said plurality of reproduced narrow band channel signals to obtain corresponding shaped output signals; and
    combining means for combining said corresponding shaped output signals so as to recover and reproduce said wide band channel information signals;
    wherein said shaping means comprises a limiter circuit for limiting said plurality of reproduced narrow band channel signals to provide corresponding limiter outputs, an FM discriminator for discriminating said limiter outputs to provide discriminator outputs, and a shaper and time-centering circuit for shaping and time-centering said discriminator outputs, whereby to obtain said corresponding shaped output signals.

7. The system of claim 6, further comprising dot interlace means for dot interlacing said received wide band channel information signals in accordance with synchronization of said wide band channel information signals to derive sample pulse outputs, said sampling means comprising a circuit for sampling said received wide band channel information signals in accordance with said sample pulse outputs.

8. The system of claim 7, wherein said dot interlace means comprises a sync separator for deriving a horizontal sync signal from said received wide band information signal, a phase discriminator for discriminating said horizontal sync signal to derive a phase discriminator output, an oscillator for generating an oscillator output having a frequency, and a control circuit responsive to said phase discriminator output for controlling generation of said oscillator output by said oscillator so that said frequency is in accordance with said phase discriminator output.

9. The system of claim 8, wherein said received wide band channel information signal comprises a video signal.

10. The system of claim 6, wherein said sampling means comprises a reference channel for generating a frequency signal, a sampling pulse generator responsive to said frequency signal for generating successive enable signals, and a plurality of gates, one for each said enable signal and responsive thereto, for passing said received wide band channel information signals to said recording and reproducing means.

11. The system of claim 10, wherein said recording and reproducing means comprises a plurality of amplifiers, one for each of said enable signals, for receiving and amplifying said received wide band channel information signals passed by said plurality of gates.

12. The system of claim 6, wherein said shaping means comprises a shaping circuit for shaping said plurality of reproduced narrow band channel signals to produce corresponding shaper outputs, and a demodulator/time position circuit for demodulating and time-positioning said corresponding shaper outputs, whereby to obtain said corresponding shaped output signals.

13. A method of recording and reproducing wide band channel information signals by means of several narrow band channels, comprising the steps of:
receiving said wide band channel information signals;
dot interlacing said received wide band channel information signals in accordance with, and automatically controlling the phase relationship with respect to, synchronization of said wide band channel information signals to derive sample pulse outputs of a controlled frequency and phase relationship;
sampling said received wide band channel information signals in accordance with said sample pulse outputs to derive a plurality of narrow band channel signals;
recording and reproducing said plurality of narrow band channel signals to obtain a corresponding plurality of reproduced narrow band channel signals;
shaping each of said plurality of reproduced narrow band channel signals to obtain corresponding shaped output signals; and
combining said corresponding shaped output signals so as to recover and reproduce said wide band channel information signals wherein said shaping step comprises limiting said plurality of reproduced narrow band channel signals to provide corresponding limiter outputs, discriminating said limiter outputs to provide discriminator outputs, and shaping and time-centering said discriminator outputs to obtain said corresponding shaped output signals.

14. The method of claim 13, wherein said dot interlacing step comprises deriving a horizontal sync signal from said received wide band information signal, phase discriminating said horizontal sync signal to derive a phase discriminator output, generating an oscillator output having a frequency, and controlling said generating of said oscillator output so that said frequency is in accordance with said phase discriminator output.

15. The method of claim 14, wherein said received wide band channel information signal comprises a video signal.

16. The method of claim 13, wherein said sampling step comprises generating a frequency for reference in an additional channel signal, and wherein said shaping step comprises generating a waveform output in accordance with said reference, and gating each successive narrow band recorded and reproduced signal in correspondence to said waveform output.

17. The method of claim 13, further comprising the step, between said shaping and combining steps, of processing said shaped output signals in accordance with pulse position modulation.

18. A system for recording and reproducing wide band channel information signals by means of several narrow band channels, comprising:
receiving means for receiving said wide band channel information signals;
dot interlace means for dot interlacing said received wide band channel information signals in accordance with, and for automatically controlling the phase relationship with respect to, synchronization of said wide band channel information signals to derive sample pulse outputs of a controlled frequency and phase relationship;
sampling means for sampling said received wide band channel information signals in accordance with said sample pulse outputs to derive a plurality of narrow band channel signals;
recording and reproducing means for recording and reproducing said plurality of narrow band channel signals to obtain a corresponding plurality of reproduced narrow band channel signals;
shaping means for shaping each of said plurality of reproduced narrow band channel signals to obtain corresponding shaped output signals; and
wherein said shaping means comprises a limiter circuit for limiting said plurality of reproduced narrow band channel signals to provide corresponding limiter outputs, an FM discriminator for discriminating said limiter outputs to provide discriminator outputs, and a shape and time-centering circuit for shaping and time-centering said discriminator outputs, whereby to obtain said corresponding shaped output signals.
combining means for combining said corresponding shaped output signals so as to recover and reproduce said wide band channel information signals.

19. The system of claim 18, wherein said dot interlace means comprises a sync separator for deriving a horizontal sync signal from said received wide band information signal, a phase discriminator for discriminating said horizontal sync signal to derive a phase discriminator output, an oscillator for generating an oscillator output having a frequency, and a control circuit responsive to said phase discriminator output for controlling generation of said oscillator output by said oscillator so that said frequency is in accordance with said phase discriminator output.

20. The system of claim 19, wherein said received wide band channel information signal comprises a video signal.

21. The system of claim 18, wherein said sampling means comprises a reference channel for generating a frequency signal, a sampling pulse generator responsive to said frequency signal for generating successive enable signals, and a plurality of gates, one for each said enable signal and responsive thereto, for passing said received wide band channel information signals to said recording and reproducing means.

22. The system of claim 21, wherein said recording and reproducing means comprises a plurality of amplifiers, one for each of said enable signals, for receiving and amplifying said received wide band channel information signals passed by said plurality of gates.

23. The system of claim 18, wherein said shaping means comprises a shaping circuit for shaping said plurality of reproduced narrow band channel signals to produce corresponding shaper outputs, and a demodulator/time position circuit for demodulating and time-positioning said corresponding shaper outputs, whereby to obtain said corresponding shaped output signals.

24. A system for recording and reproducing wide band channel information signals by means of several narrow band channels, comprising:
   receiving means for receiving said wide band channel information signals;
   dot interlace means for dot interlacing said received wide band channel information signals in accordance with synchronization of said wide band channel information signals to derive sample pulse outputs;
   sampling means for sampling said received wide band channel information signals in accordance with said sample pulse outputs to derive a plurality of narrow band channel signals;
   recording and reproducing means for recording and reproducing said plurality of narrow band channel signals to obtain a corresponding plurality of reproduced narrow band channel signals;
   shaping means for shaping each of said plurality of reproduced narrow band channel signals to obtain corresponding shaped output signals; wherein said shaping means comprises a limiter circuit for limiting said plurality of reproduced narrow band channel signals to provide corresponding limiter outputs, an FM discriminator for discriminating said limiter outputs to provide discriminator outputs, and a shaper and time-centering circuit for shaping and time-centering said discriminator outputs, whereby to obtain said corresponding shaped output signals; and
   combining means for combining said corresponding shaped output signals so as to recover and reproduce said wide band channel information signals.

25. A system for recording and reproducing wide band channel information signals by means of several narrow band channels, comprising:
   receiving means for receiving said wide band channel information signals;
   sampling means for sampling said received wide band channel information signals so as to derive a plurality of narrow band channel signals;
   recording and reproducing means for recording and reproducing said plurality of narrow band channel signals to obtain a corresponding plurality of reproduced narrow band channel signals;
   shaping means for shaping each of said plurality of reproduced narrow band channel signals to obtain corresponding shaped output signals; and
   combining means for combining said corresponding shaped output signals so as to recover and reproduce said wide band channel information signals;
   wherein said shaping means comprises a limiter circuit for limiting said plurality of reproduced narrow band channel signals to provide corresponding limiter outputs, and a discriminator for discriminating said limiter outputs to provide discriminator outputs, and wherein said discriminator circuit comprises a one-shot sawtooth generator producing a one-shot sawtooth output, and a gate for receiving said one-shot sawtooth output, said system further comprising reference pulse generator means for generating a reference pulse, and delay means for receiving and delaying said reference pulse to provide a delayed reference pulse, said delayed reference pulse being provided to said gate, said gate being responsive to said one-shot sawtooth output and to said delayed reference pulse for producing an output representing an intersection of the one-shot sawtooth output and the reference pulse, whereby to obtain said corresponding shaped output signals.

* * * * *